United States Patent
Terranova et al.

[11] Patent Number: 6,112,134
[45] Date of Patent: Aug. 29, 2000

[54] SINGLE METER OCTANE BLENDING APPARATUS

[75] Inventors: Steven N. Terranova, Durham; Seifollah S. Nanaji, Greensboro, both of N.C.

[73] Assignee: Marconi Commerce Systems Inc., Greensboro, N.C.

[21] Appl. No.: 09/087,030

[22] Filed: May 29, 1998

[51] Int. Cl.[7] .................................................. G06F 17/00
[52] U.S. Cl. ............................... 700/239; 222/59; 137/3
[58] Field of Search ................................. 700/239, 240, 700/241; 222/59; 137/3, 88, 93, 607

[56] References Cited

U.S. PATENT DOCUMENTS

| | | | |
|---|---|---|---|
| 3,751,644 | 8/1973 | Mayer | 235/151.12 |
| 3,864,095 | 2/1975 | Sinclair et al. | 44/2 |
| 3,999,959 | 12/1976 | Bajek | 44/2 |
| 4,223,807 | 9/1980 | Caswell et al. | 222/28 |
| 4,876,530 | 10/1989 | Hill et al. | 340/605 |
| 4,876,653 | 10/1989 | McSpadden et al. | 364/479 |
| 4,963,745 | 10/1990 | Maggard | 250/343 |
| 4,978,029 | 12/1990 | Furrow et al. | 222/1 |
| 5,014,211 | 5/1991 | Turner et al. | 364/478 |
| 5,018,645 | 5/1991 | Zimsmeyer | 222/14 |
| 5,029,100 | 7/1991 | Young et al. | 364/479 |
| 5,038,971 | 8/1991 | Gayer et al. | 222/1 |
| 5,125,533 | 6/1992 | Gayer et al. | 222/28 |
| 5,163,586 | 11/1992 | Zinsmeyer | 222/14 |
| 5,203,384 | 4/1993 | Hansen | 141/59 |
| 5,222,027 | 6/1993 | Williams et al. | 364/479 |
| 5,223,714 | 6/1993 | Maggard | 250/343 |
| 5,225,679 | 7/1993 | Clarke et al. | 250/343 |
| 5,257,720 | 11/1993 | Wulc et al. | 222/20 |
| 5,400,253 | 3/1995 | O'Connor | 364/479 |
| 5,412,581 | 5/1995 | Tackett | 364/498 |
| 5,447,062 | 9/1995 | Kopl et al. | 73/261 |
| 5,469,830 | 11/1995 | Gonzalez | 123/515 |
| 5,569,922 | 10/1996 | Clarke | 250/339.12 |
| 5,606,130 | 2/1997 | Sinha et al. | 73/627 |
| 5,630,528 | 5/1997 | Nanaji | 222/1 |
| 5,706,871 | 1/1998 | Andersson et al. | 141/59 |
| 5,895,457 | 4/1999 | Kurowski et al. | 705/413 |
| 5,921,263 | 7/1999 | Negley, III | 137/3 |
| 5,956,254 | 9/1999 | Collins | 364/479.09 |
| 5,979,705 | 11/1999 | Kaehler et al. | 222/71 |
| 6,006,775 | 12/1999 | Negley, III | 137/93 |

FOREIGN PATENT DOCUMENTS

| | | |
|---|---|---|
| 0 572 621 B1 | of 1992 | European Pat. Off. . |
| 0 723 929 A1 | of 1996 | European Pat. Off. . |
| 9802587 | of 0000 | Sweden . |
| 2 333 508 | 7/1999 | United Kingdom ............ B87D 5/58 |
| PCT92/21971 | 12/1992 | WIPO . |
| WO 98/15457 | of 1998 | WIPO . |

OTHER PUBLICATIONS

TLS–305R Business Management and Environmental Compliance System; Copyright 1997.

*Primary Examiner*—Christopher P. Ellis
*Assistant Examiner*—Khoi H. Tran
*Attorney, Agent, or Firm*—Coats & Bennett, P.L.L.C.

[57] ABSTRACT

The present invention relates to a fuel dispensing apparatus and method for blending at least one blended fuel using a single meter both the blended fuel and the blend components. The invention includes an apparatus for dispensing a blended fuel that includes first and second valves in fluid communication with a low octane blend component and a high octane blend component respectively. A meter is in fluid communication with the first and second valves for generating a signal indicative of the volume of the blended fuel dispensed from the apparatus. The invention further includes a real time octane sensor in fluid communication with the blended fuel for generating an output signal indicative of the octane level of the blended fuel. A blend controller receives the octane sensor output signal and generates output control signals to the first and second control valves to maintain the blended product octane level at a predetermined level or within a predetermined range.

30 Claims, 3 Drawing Sheets

SINGLE METER OCTANE BLENDING APPARATUS

FIELD OF THE INVENTION

The present invention relates generally to dispensing systems for delivering a desired blend of two products to a user. More particularly, the invention relates to monitoring the octane level of two fuel components in a blending process to ensure that a properly blended product is produced.

The present invention relates generally to a method and apparatus for dispensing a desired blend of two or more fluids, particularly fuel. The present invention involves a fluid dispenser which dispenses a blended mixture of fluid from more than one fluid source, passes the blended fluid through a common meter, measures the characteristics of the blended fluid and controls the amount of fluid from each source to deliver the desired ratio of fuel sources blended together.

BACKGROUND OF THE INVENTION

Retail fuel dispensers and pumps are used to fuel automobiles. Service stations have underground storage tanks which contain the fuel to be delivered. Basic fuel dispensers or pumps are comprised of a housing, internal delivery chambers, meters, control electronics and devices, hoses and nozzles for delivery of fuel, and display units to show the amount of fuel dispensed. The pumping unit to drive the fuel through a dispenser and out through the hose and nozzle is contained in the underground storage tank. Dispensers are the most common type of retail fuel delivery device used in the United States. Pumps also contain all of the basic elements of a dispenser, but the pumping unit is found inside the pump housing itself rather than in the underground storage tank. For the purposes of this application, the terms "dispenser" and "pump" are used interchangeably.

One core responsibility of a dispenser is to measure the amount of fuel delivered to the customer. This measurement is performed by meters in the dispenser. Fuel comes from the underground storage tank into the dispenser through some type of conduit or chamber controlled by a valve which can open and close to allow and preclude the flow of fuel. After the fuel passes through the valve, the fuel flows through a metering device. There are many types of metering devices, but the most common type of meter used in dispensers is a positive-displacement meter. A positive displacement meter measures the amount of fluid by counting the number of displacements of a known volume. For every such displacement, a quantifiable number of electronic pulses is generated by an electromechanical pulser connected to the meter. Therefore by knowing the number of pulses, the volume of fuel flowing through the meter is ascertainable by the dispenser. Basic dispensers as the one described here only allow the ability to deliver a single octane or grade of fuel to a customer.

A recent development in dispenser technology is the ability of a single dispenser to deliver multiple octane levels of fuel to a customer. One of this type of dispenser is sold under the brand MPD® which is a registered trademark of Gilbarco Inc. A MPD® dispenser usually contains one meter for every grade of fuel available to the customer. Different octanes or grades of fuel are stored separately in underground storage tanks. The dispenser delivers fuel from the correct underground storage tank depending on the grade of fuel selected by the customer. For example, if the customer selects octane grade 89, the dispenser will draw fuel from the underground storage tank containing that product, measure the fuel through a meter for measurement and route the fuel to the appropriate hose and nozzle for delivery to the customer.

A more recent evolution of technology in dispensers involves blending systems. Blending dispensers, called blenders, are used to dispense a plurality of different octane grades of fuel by blending a high octane and a low octane fuel to create one or more mid-level octane fuels. Blenders are advantageous, because service stations can deliver multiple grades of fuel without having to provide a separate underground storage tanks for each grade of fuel. Service stations using blending dispensers need have only two underground storage tanks, one for the high octane fuel and the other for the low octane fuel. Also, blenders require only two meters; one meter for the high octane and one meter for the low octane. For example, if a service station wants to install blenders capable of delivering 87, 89, 91, 92 and 93 octane fuels, the intermediate octane fuels of 89, 91, and 92 can be created by blending the correct proportions of 87 and 93 octane fuels. Additional information concerning blending dispensers is contained in Gilbarco Inc. brochure number P1876B titled "Blending With Gilbarco" the content of which is incorporated herein by reference. A patented example of a blending system is that described in U.S. Pat. No. 4,876,653 titled "Programmable Multiple Blender" ("the '653 patent") assigned to Gilbarco Inc. the content of which is incorporated herein by reference. The '653 patent discloses a system for blending low and high octane gasoline with the fuel flow rate in each of two fuel flow paths being under individual closed loop control. The system includes an algorithm for comparing the ratio of the actual accumulated volumes of the low octane to the high octane fuel relative to a statistically determined ratio of the ideal volume of the low to high octane fuel for the total accumulated volume of the sum of the volumes of the fuels at a given time. The system provides a very exact blend relative to a pre-selected blend ratio. In dispenser blending systems, it is imperative to have a meter for both the high and low octane fuels so that the dispenser can determine the amount of high and low octane fuel being blended to produce the correct ratio of blended fuel. For example, a dispenser may have 93 octane as it its high octane fuel and 87 as its low octane fuel. If the dispenser is setup to produce one intermediate grade of fuel at 90 octane, the dispenser must meter each grade independently and provide a control mechanism to control the high and low octane fuels at a 50/50 ratio. The actual octane level of the blended fuel is not measured in the dispenser.

An alternative blending system is disclosed in U.S. Pat. Nos. 5,038,971 and 5,125,533, the content of which is disclosed herein by reference.

Another further development in fuel dispensing systems is disclosed in U.S. Pat. No. 5,630,528 entitled "Method And Apparatus For Metering And Dispensing Fluid, Particularly Fuel" ("the '528 patent") assigned to Gilbarco Inc. The content of the '528 patent is incorporated herein by reference. This patent discloses a fuel dispenser which employs a single meter to measure multiple octane grades of fuel. It is more cost effective to have one single meter in a fuel dispenser than multiple meters. The system described in the '528 patent does not allow blending of fuels while still employing a single common meter. Heretofore blending dispensers have required two meters to measure both the high and low octane fuels to produce a desired ratio of each for intermediate fuel grades. For example, if the high octane grade is 93 and the low octane grade is 87, then a 50/50 blend ratio would produce an octane grade of 90. A blending dispenser known in the art today can determine only if a 50/50 ratio is being achieved by using two meters; one meter measures the amount of high octane fuel and the other meter measures the amount of low octane fuel. Because dispensers employing single meters are not manufactured by retail dispenser companies today, no one to the knowledge of the inventor has disclosed a solution to allow dispensers to employ a single meter, but also provide blending. Blending systems known in the art require at least two meters to produce a proper ratio of a blended fuel.

The advent of real time octane sensors provides a solution to the problem described above. The use of an octane sensor provides a method of blending totally different from the blending systems known in the dispenser art today. Because the octane sensor can measure the actual octane level of a blended fuel, two separate meters for both the low and high octane fuels are no longer necessary. An octane sensor can be included as a control parameter for octane blending in the control device of the dispenser. An example of such a sensor is that disclosed in Clarke et al., U.S. Pat. No. 5,225,679 the content of which is incorporated herein by reference. This sensor monitors hydrocarbon-based fuel properties using a mid-IR light source to illuminate fuel in a side stream flow provided for octane monitoring. The light passing through the fuel is received by a narrow bandwidth detector. The molecules of the fuel components are excited by the mid-IR light, and the amount of absorption exhibited by these excited molecules is detected and used to identify the presence of and to quantify the volume percent of the fuel components in solution. This information maybe used to determine known properties of the fuel solution to include octane levels.

A method of determining octane rating of fuel is also disclosed in U.S. Pat. No. 5,606,130 to Sinha et al. the content of which is incorporated herein by reference. The octane rating is determined by measuring the acoustic resonance in fuel and directly relating the resonance characteristics to experimentally observed values for known octane ratings.

The use of an octane sensor in a blending dispenser is a novel way to overcome the obstacle of requiring two separate meters to meter blending components.

SUMMARY OF THE INVENTION

The present invention provides a method and system for monitoring the octane levels of the components of a blended fuel as they are stored and as they are fed into a blending dispenser for three purposes. First, the system uses information concerning the octane levels of the product being supplied to the blending system to ensure that a properly blended product is produced. Second, the system ensures that the blending components available in the on-site fuel storage tanks are capable of creating the posted octane levels for blended fuel products. Third, the system ensures that only the necessary amount of expensive blending component is used to create a desired intermediate octane blend. The octane level information may be supplied in a number of different ways to the dispensing system components. The information may be fed from octane sensors located in underground fuel tanks to an electronic site controller or indirectly from the sensors to some other component of the fueling system and then to the site controller. Octane level information may also be supplied from tank-mounted sensors directly to blending dispensers for use by dispenser blending systems.

It should be understood that both the foregoing general description and the following detailed description are exemplary and explanatory only and are not restrictive of the invention as claimed. The accompanying drawings, which are incorporated in and constitute a part of this specification, illustrate one embodiment of the invention and, together with the description, serve to explain the principles of the invention. It should also be understood that each of the embodiments described above has distinct advantages and that alternative combinations of the components of these embodiments may be used to create a variety of systems depending on the objectives and performance criteria desired.

DESCRIPTION OF THE PREFERRED EMBODIMENTS

The present invention relates to an apparatus for dispensing fluids comprised of first and second fluid sources containing first and second fluids of different octane levels. These fluid sources are in fluid communication with first and second flow control valves respectively. The valves control the amount of the first and second fluids that are mixed together to form a mixed fluid delivered to a meter. The meter passes the mixed fluid to at least one octane sensor for measurement of the octane level of the mixed fluid. The mixed fluid is then passed to at least one fluid outlet. The octane sensor is connected to a control device for reading the octane level of the mixed fluid and controlling the first and second valves to ensure that the correct proportion of the first and second fluids are mixed together to produce a mixed fluid having a desired octane level.

Figure 1:
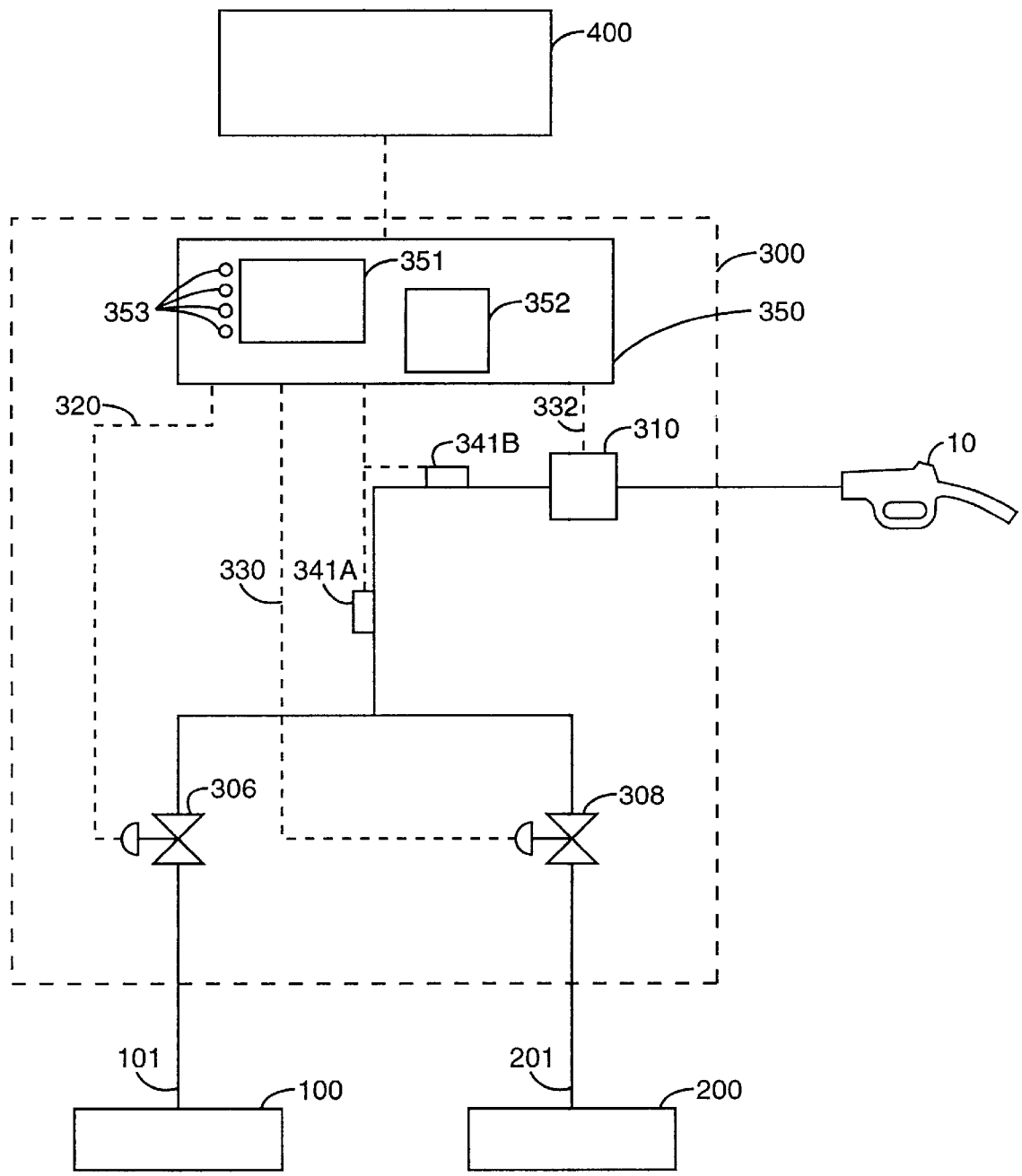
FIG. 1 is a block diagram of one embodiment of the present invention showing high octane and low octane blending components, a blending dispenser and a site controller.

A preferred embodiment of the present invention shown in FIG. 1 includes low octane product fuel tank 100, high octane product fuel tank 200, fuel dispenser 300, and site controller 400 in electronic communication with fuel dispenser electronics 350. Site controller 400 provides means for operating personnel to monitor and control the operation of fuel dispenser 300 and monitor the octane level in fuel tanks 100,200. It should be understood that although only one fuel dispenser 300 is shown in FIG. 1, a typical installation would include several dispensers each in fluid communication with fuel tanks 100, 200 and in electronic communication with site controller 400, as is well known in the art.

Fuel dispenser 300 is in fluid communication with product sources 100,200 via supply lines 101,201 and includes a customer display 351, and octane level display 352, and product blend selectors 353 for customer use to select the blended or non-blended product desired for a particular transaction. Customer display 351 displays information corresponding to the volume measurements made by flow meter 310. It will be readily understood that, although octane level display 352 is shown as a separate item in FIG. 1, this item may be integrated into customer display 351. The other components of fuel dispenser 300 include first and second flow control valves 306,308 which are in fluid communication with product sources 100,200. Fuel control valves 306,308 are in fluid communication with octane sensor 341 A/B which generates an output signal indicative of the octane level of the blended product. Flow meter 310 is provided downstream of and in fluid communication with octane sensor 341 A/B and provides electronic signal 322 to dispenser electronics 350 indicative of the flow rate of the product being delivered to nozzle 10. Flow meter 310 may be any type of positive displacement or other type of flow meter well known in the art. As is well known in the art, nozzle 10 is connected to dispenser 300 via a flexible hose. Dispenser electronics 350 include a blend controller for receiving the output signal from octane sensor 341 A/B and generating output control signals via control lines 320,330 to flow control valves 306,308. Various other components such as fuel filters, check valves, solenoids and the like may also be provided as necessary.

The structure of a fuel blending dispenser embodying the present invention may vary greatly depending on the needs of a particular application. The positioning of the meters, flow control valving and octane sensors also may be combined in various ways. Some typical examples are illustrated in FIGS. 2–4 and 6–7 of the '528 patent. The meter may be positioned in an upper structure so as to be closer to nozzle 10 (FIG. 7) or may be placed in a lower dispenser body closer to the flow control valves (FIG. 6). It can be seen that the meter may or may not be positioned adjacent to either the octane sensors or to the flow control valves.

The term "real time octane sensor" as used herein means an octane sensing device capable of determining the octane level and transmitting a signal indicative of the octane level of a gasoline fluid to a dispenser controller or to some other device. The sensor must be capable of performing this function fast enough to enable the dispenser controller to correct a blending process continuously within the time span of a typical retail transaction. The scope of the present invention includes the use of currently known octane sensors and those that may be developed in the future so long as they meet this performance requirement.

Although octane sensors 341 is shown in FIG. 1 as being mounted upstream of flow meter 310, they may also be mounted downstream of flow meter 310. Either location is equivalent for the purposes of the present invention. The octane sensor location shown in FIG. 1 provides somewhat of an advantage to the blending process as it provides the output signal at an earlier point in the process than would be provided if the sensor was located downstream of flow meter 310. Again, given the definition of real time octane sensor provided above, the octane sensors 341 may be provided at either location.

In an alternative embodiment, at least two multiple octane sensors may be provided in series or in parallel flow to independently sense the octane level of the fuel blend. An averaging function in dispenser electronics 350 may be used to average the multiple octane level readings to determine whether an operational problem exists with one or more of the octane sensors. Dispenser electronics 350 may also evaluate the range of octane level by values provided by the multiple octane sensors as a means to detect an operational problem. If multiple octane sensors are used, they may be of the same type or of different types to provide redundancy and enhance reliability of the system. For example, one sensor may be a light source sensor as described in the '679 patent and the other may be an acoustic resonance sensor as described in U.S. Pat. No. 5,606,130. Optionally, the dispenser displays 351,352 for an operator station associated with site controller 400 may display the different outputs of the multiple octane sensors.

Dispenser electronics 350, also referred to as a control device, may also include a feature wherein the operation of octane sensors 341 are checked for proper operation. If proper operation is not detected, an appropriate message may be displayed at customer/fuel display 351 and/or octane display 352.

Figure 3:
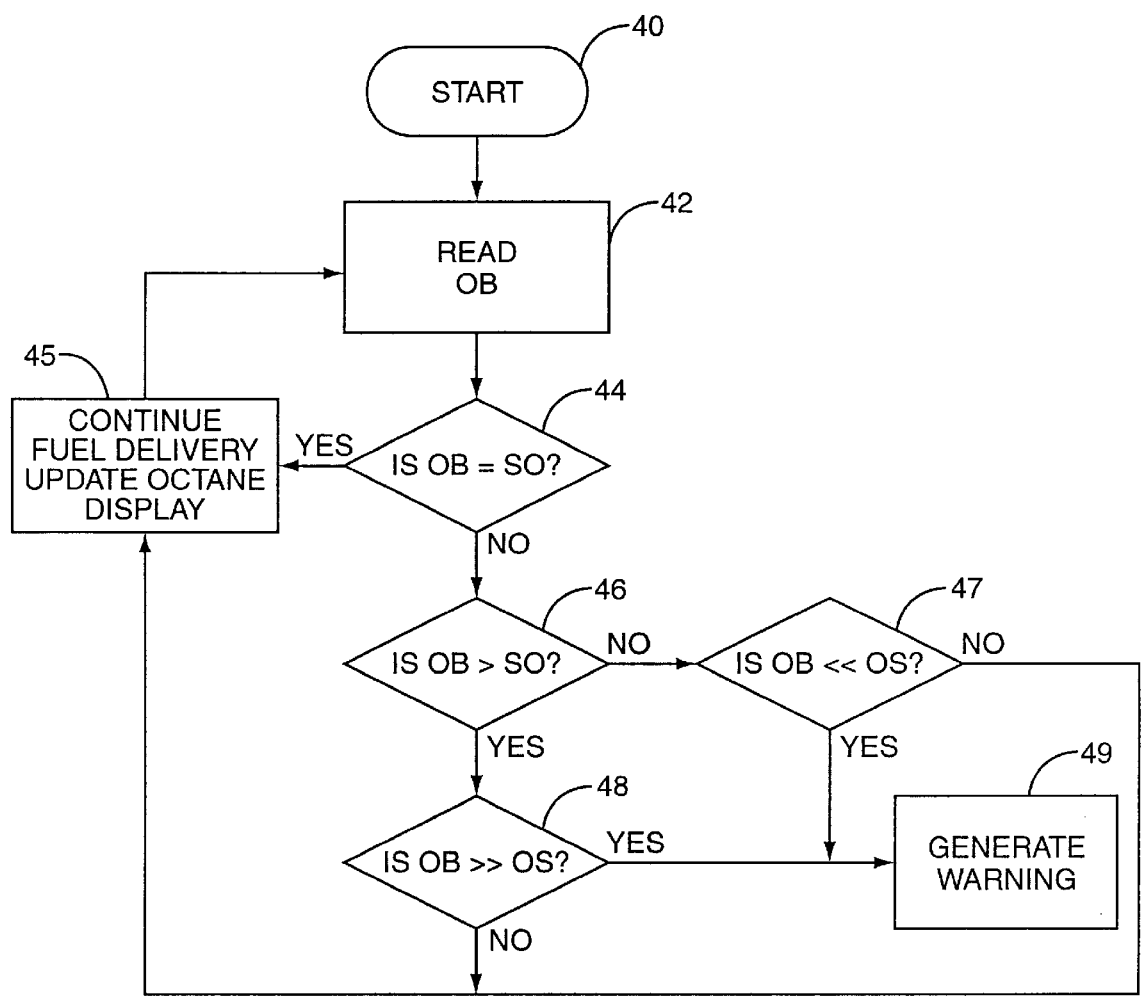
FIG. 3 is a flow chart illustrating an alternative embodiment of the present invention that determines whether a requested blended fuel can be produced or produced economically given the octane levels of the available blending components.

The flow chart shown in FIG. 3 illustrates a preferred embodiment of the present invention using octane sensors in a fuel blending operation to incorporate the actual octane levels of the blending components into the blending process. The symbols used in the flow charts that follow are defined as follows:

"OD" and "SO" refer to the octane level of the product requested by the customer. This product may be a low octane product or high octane product which normally require no blending or may be one or more mid-octane products which require blending.

"OB" refers to the measured octane level of the blended product.

"LO" and "HO" refer to the low octane blending component and the high octane blending component respectively.

Figure 2:
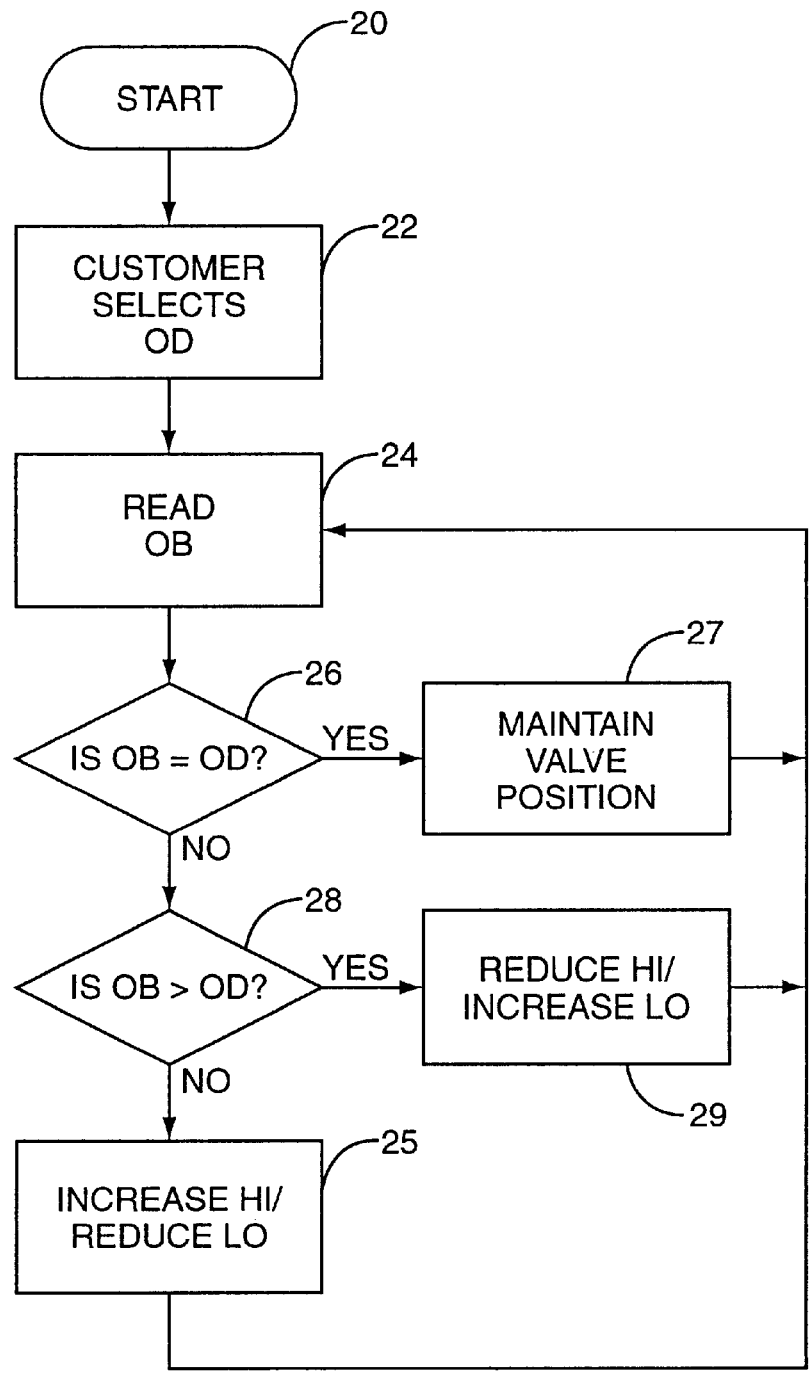
FIG. 2 is a flow chart illustrating the process steps using octane sensors in a low octane fuel and a high octane fuel for controlling the operation of a dispenser blending system.

Referring now to FIG. 2, the blend control process is entered at 20 and proceeds to 22 where the customer selects the fuel and the octane level to be delivered. In this example, the mid-octane product has been selected. Next, as fuel delivery begins, the blending controller in dispenser electronics 350 (or site controller 400) reads the octane level of the blended product using the output signal from blend octane sensors 341. At test 26 the octane level of the blended product is compared to a predetermined value or a predetermined range of values. It should be understood that at test 26 the blend component octane values need not be identical to a single set point to satisfy the test. There may be room for a small amount of variation while still satisfying the test due to instrument error and as may be allowed by regulatory authorities. For instance a nominal 87 octane product may be acceptable if the actual measured octane value varies by ½ to 1 point on either side of that value. The exact of amount of acceptable variance can be determined readily by a person of ordinary skill. It should be understood that this comparison step includes comparison of the measured octane level to not only a fixed target value, but also to a target range of values.

If test 26 answers "yes," then the routine proceeds to 27 where flow control valves 306, 308 are left in their current positions. This means that no control signals are generated beyond those normally generated by the system disclosed in the '653 patent. The routine returns to 24 to read the octane levels of the blend components are read again.

If test 26 answers no, then the routine proceeds to test 28 where blend controller inquires whether OB is greater than OD. If test 28 answers yes, then the control routine proceeds to 29 where the amount of high octane component provided is reduced and the amount of low octane component is increased. If test 28 answers no, then the control routine proceeds to 25 where the amount of high octane component provided is increased and the amount of low octane component is decreased. Dispenser electronics 350 controls flow control valves 306, 308 to reduce/increase the amount of high octane or low octane blend component as necessary. This step amounts to changing the mixing ratios used for the blending components used to create the blended fuel. Either action may be used singly or in combination to correct the octane level of the blended product. This control step is accomplished based on the actual octane levels of the blended product and not based on an assumed octane level.

Another operational aspect of the present invention is described in the flow chart shown in FIG. 3. The process here starts at 40 and proceeds to 42 where dispenser electronics 350 reads the output of blend octane sensors 341. At the same time SO is read from a memory location. At test 44 OB is compared to SO. If the two values are not equal the routine proceeds to test 46 where OB is again compared to SO to determine whether OB is greater than SO. If this test answers no, then the routine proceeds to 47 where it is determined whether the value of OB is so far below that of SO as to exceed a predetermined limit. This difference between the values could relate to the tolerance and octane level permitted by regulatory authorities. If this test answers no, then the routine proceeds to block 45. If this test answers yes, then the routine proceeds to block 49 where a warning to operating personnel is generated. The routine could include the additional step at this point of stopping fuel delivery if OB is too far out of tolerance.

If this test answers no, then the routine proceeds to block 45 which permits the fuel delivery to continue but updates the octane display 352 for the customer to show that an octane level higher than that selected is being provided. The system could also incorporate memory provided to record all occurrences of a higher octane product being dispensed than was actually selected. A record of such occurrences can be used by regulatory authorities to monitor blending performance and may be used by operators to make appropriate adjustments.

Historical information concerning the octane levels of the blending components may be stored in dispenser electronics 350, site controller 400 or other storage device for compliance monitoring by weights and measures authorities. These authorities may monitor octane levels from a remote location using the techniques described herein. The advantages of such remote monitoring include reduced costs of compliance inspections and the ability to conduct unannounced monitoring checks on octane levels being delivered to the public.

The blend controller embodied in dispenser electronics 350 may also perform the function of notifying operating personnel and customers if the incoming blend components are incapable of creating the desired blended or non-blended fuel. As the blend controller issues instructions to flow control valves, those instructions either will or will not bring the octane level of the blended fuel to a desired point or within a desired range. If they do not, then the scope of the present invention includes the blend controller generating an alarm either at the point of fueling or at a remote operator location. This alarm may be either a visual or audible alarm or some combination of both. Also, the alarm may be transmitted to a remote location. The term remote location includes both the site controller that is in communication with dispenser electronics 350 and a location far removed from the location of the dispenser.

It will be readily appreciated by a person of ordinary skill in the electronics art that the blend controller or control device described herein need not be a separate component of dispenser electronics. The blend control functions may be completely integrated with electronic components that perform other functions. In fact, certain electronic components may share both blending and non-blending duties. The scope of the present invention should be understood to include a completely integrated dispenser electronics package.

Although the present invention has been described with preferred embodiments, it is to be understood that modifications and variations may be utilized without departing from the spirit and scope of this invention, as those of skill in the art will readily understand. Such modifications and variations are considered to be within the purview and scope of the appended claims and their equivalents.

We claim:

1. A fluid dispensing apparatus comprising:
    first and second fluid sources containing first and second fluids of different octane levels;
    first and second valves in fluid communication with the first and second fluid sources respectively, to control an amount of the first and second fluids passing through the first and second valves, respectively;
    a junction at which the first and second fluids are joined, to form a mixed fluid;
    a meter providing an indication of an amount of the mixed fluid passing through the meter;
    a fluid dispensing outlet receiving the mixed fluid passed through the meter; and
    at least two octane sensors, each adapted to measure an octane level of the mixed fluid;
    the at least two octane sensors connected to a control device that controls the first and second valves to affect a proportion of the first and second fluids that are mixed together to produce the mixed fluid to achieve a desired octane level in the mixed fluid, and wherein said control device bases said control of the first and second valves on measured octane determined by averaging a first octane measurement from a first one of the at least two octane sensors with a second octane measurement from a second one of the at least two octane sensors.

2. The apparatus of claim 1, further comprising a fluid display device, the fluid display device displaying information corresponding to measurements made by the meter.

3. The apparatus of claim 1, further comprising an octane display device, the octane display device displaying information corresponding to the measured octane level.

4. The apparatus of claim 1, wherein the control device determines if the at least two octane sensors are operating properly based on comparing the first and second octane measurements.

5. The apparatus of claim 1 wherein the control device determines whether the measured octane of the mixed fluid is within a defined range of the desired octane.

6. The apparatus of claim 5 further comprising an octane display device which indicates whether the measured octane of the mixed fluid is within the defined range of the desired octane.

7. The apparatus of claim 5 wherein the control device sends a signal to a site controller which generates an alarm if the measured octane is not within the defined range of the desired octane.

8. The apparatus of claim 7 wherein the alarm is an audible alarm.

9. The apparatus of claim 7 wherein the alarm is a visual alarm.

10. The apparatus of claim 1 wherein the first and second valves are located adjacent the meter.

11. The apparatus of claim 1 wherein the meter is located adjacent the at least two octane sensors.

12. The apparatus of claim 1 wherein the meter is located adjacent at least one fuel outlet.

13. A fuel-dispensing apparatus comprising:
    first and second fuel sources;

first and second valves responsive to a control signal, the first and second valves controlling a flow of the first and second fuel sources respectively to determine an amount of the first and second fuel sources mixed together to form a mixed fuel;

a meter for metering the mixed fuel;

at least one octane sensor in fluid communication with the mixed fuel, the at least one octane sensor providing an octane reading related to an octane of the mixed fuel;

a fuel discharge nozzle in fluid communication with the meter adapted to dispense the mixed fuel; and a control device generating the control signal based on the octane reading, the control signal generated such that the first and second valves control the flow of the first and second fuel sources to ensure that the octane of the mixed fluid is within a defined range of a desired octane, the control device additionally determining if the at least one octane sensor is operating properly.

14. The apparatus of claim 13 wherein the first and second valves are flow control valves and the control device controls the relative opening of the flow control valves to control a blending of the first and second fluids, thereby forming the mixed fluid.

15. The apparatus of claim 13 wherein the control device controls the duration of flows through the first and second valves.

16. The apparatus of claim 13 wherein the control device controls the valves so that one of the valves is open when the other is closed and vice versa to achieve the desired octane in the mixed fluid.

17. The apparatus of claim 13, further comprising a fuel display device, the fuel display device displaying information corresponding to measurements of the mixed fuel made by the meter.

18. The apparatus of claim 13, further comprising an octane display device, the octane display device displaying information corresponding to the octane reading measured by the at least one octane sensor.

19. The apparatus of claim 13 wherein the first and second valves are located adjacent the meter.

20. The apparatus of claim 13 wherein the meter is located adjacent the at least one octane sensor.

21. The apparatus of claim 13 wherein the meter is located adjacent the at least one fuel discharge nozzle.

22. The apparatus of claim 13, further comprising a housing unit, the housing unit comprising an upper structure, the meter and the at least one octane sensor being located in the upper structure.

23. The apparatus of claim 13, wherein the at least one octane sensor is a light source sensor.

24. The apparatus of claim 13, wherein the at least one octane sensor is an acoustic resonance sensor.

25. The apparatus of claim 13, wherein the at least one octane sensor is comprised of at least two different types of octane sensors, the octane reading including an octane measurement from each of the at least two different types of octane sensors.

26. A blended-fuel dispensing apparatus comprising:

first and second valves in fluid communication with a low octane blend component and a high octane blend component, the first and second control valves controlling an amount of the low and high octane components, respectively, that are mixed to form a blended fuel;

a meter in fluid communication with first and second valves that generates a signal indicative of the volume of the blended fuel dispensed from the apparatus;

a real time octane sensor in fluid communication with the blended fuel that generates an output signal indicative of an octane level of the blended fuel;

a blend controller that receives the octane sensor output signal and generates output control signals to the first and second control valves to maintain the blended fuel octane level within a predetermined range, based on the blend controller determining an average value for the blended fuel octane level from a plurality of octane level measurements stored by the blend controller in an associated memory device, wherein the plurality of octane level measurements are based on the real time octane sensor output signal; and a fuel discharge nozzle in fluid communication with the blended fuel, the fuel discharge nozzle being adapted to dispense the blended fuel.

27. The apparatus of claim 26 wherein the blend controller determines if the real time octane sensor is operating properly.

28. The apparatus of claim 26 wherein the blend controller is adapted to stop the dispensing of the blended fuel if the blended fuel octane level is outside the predetermined octane level range or is different from a predetermined octane level.

29. The apparatus of claim 26 wherein the blend controller is adapted to generate an alarm if the blended fuel octane level is outside the predetermined octane level range or is different from a predetermined octane level.

30. The apparatus of claim 26 further comprising a site controller in electronic communication with the blend controller wherein the site controller generates an alarm if the desired blended fuel cannot be created given the octane levels of the high octane and low octane blend components.

\* \* \* \* \*